United States Patent
Zheng et al.

(10) Patent No.: US 12,502,622 B2
(45) Date of Patent: Dec. 23, 2025

(54) SOLAR-DRIVEN EVAPORATION DEVICE FOR DESALINATION SYSTEM

(71) Applicants: Northeastern University, Boston, MA (US); Soleeva Energy, Inc., San Jose, CA (US)

(72) Inventors: Yi Zheng, Canton, MA (US); Ralph Ahlgren, San Jose, CA (US); Xiaojie Liu, Boston, MA (US); Yanpei Tian, Boston, MA (US); Mohamed Sonbaty, San Jose, CA (US); Khushnood Ahmad Qazi, Los Altos, CA (US)

(73) Assignees: Northeastern University, Boston, MA (US); Soleeva Energy, Inc., San Jose, CA (US)

( * ) Notice: Subject to any disclaimer, the term of this patent is extended or adjusted under 35 U.S.C. 154(b) by 381 days.

(21) Appl. No.: 18/041,130

(22) PCT Filed: Aug. 9, 2021

(86) PCT No.: PCT/US2021/045163
§ 371 (c)(1),
(2) Date: Feb. 9, 2023

(87) PCT Pub. No.: WO2022/035733
PCT Pub. Date: Feb. 17, 2022

(65) Prior Publication Data
US 2023/0264114 A1     Aug. 24, 2023

Related U.S. Application Data

(60) Provisional application No. 63/064,699, filed on Aug. 12, 2020.

(51) Int. Cl.
*B01D 1/00*     (2006.01)
*B01D 1/22*     (2006.01)
(Continued)

(52) U.S. Cl.
CPC ............. *B01D 1/0035* (2013.01); *B01D 1/22* (2013.01); *B01D 5/0066* (2013.01); *C02F 1/08* (2013.01); *C02F 1/14* (2013.01); *C02F 2103/08* (2013.01)

(58) Field of Classification Search
CPC ...... B01D 1/0035; B01D 1/22; B01D 5/0066; B01D 1/0005; C02F 1/08; C02F 1/14;
(Continued)

(56) References Cited

U.S. PATENT DOCUMENTS

2013/0315999 A1    11/2013 Paithankar et al.

FOREIGN PATENT DOCUMENTS

CN         110790873 A      2/2020
WO    WO-2019/081998 A1    5/2019
(Continued)

OTHER PUBLICATIONS

Liu, et al. "Efficient solar-driven steam generation enabled by an ultra-black paint." arXiv preprint arXiv:2005.14280 (Jun. 29, 2020). Abstract, p. 2 para 5; p. 3 para 1; p. 4 para 2; p. 5 para 2-p. 6 para 1; p. 7 para 2; p. 11 para 2; Figure 1; Figure 3; Figure 5. (Year: 2020).*

(Continued)

*Primary Examiner* — Waqaas Ali
(74) *Attorney, Agent, or Firm* — Dana M. Gordon; John D. Lanza; Foley Hoag LLP

(57) ABSTRACT

A floatable interfacial solar-driven evaporation structure includes a water impervious thermal insulation layer adapted to float on a body of water, a porous absorber layer on the water impervious thermal insulation layer, and an interlocked non-woven cotton fiber layer having a portion thereof between the water impervious insulation layer and the porous absorber layer and one or more additional portions configured to extend to the body of water to act as a (Continued)

capillary-driven pump to transport water from the body of water to the porous absorber layer. An ultra-black photothermal paint covers the exposed upper surface of the porous absorber layer to convert solar radiation impinging on the ultra-black photothermal paint into heat for use in generating water vapor from water in the porous absorber layer.

20 Claims, 11 Drawing Sheets

(51) Int. Cl.
*B01D 5/00* (2006.01)
*C02F 1/08* (2023.01)
*C02F 1/14* (2023.01)
*C02F 103/08* (2006.01)

(58) Field of Classification Search
CPC . C02F 2103/08; Y02A 20/142; Y02A 20/212; Y02A 20/124
See application file for complete search history.

(56) References Cited

FOREIGN PATENT DOCUMENTS

| WO | WO-2019/086971 A1 | 5/2019 |
| WO | WO-2022/035733 A1 | 7/2022 |

OTHER PUBLICATIONS

International Search Report and Written Opinion for International Application No. PCT/US2021/045163 dated Dec. 2, 2021.
Liu et al., "Efficient solar-driven steam generation enabled by an ultra-black paint," arXiv: pp. 1-13 (2020).
Xu et al., "Low cost, facile, environmental friendly all biomass-based squid ink-starch hydrogel for efficient solar-steam generation," Journal of Materials Chemistry A: 24108-24116 (2020).
Supplementary European Search Report for EP Application No. 21856495.3 dated Aug. 2, 2024.
Wu et al., "Photothermal materials: A key platform enabling highly efficient water evaporation driven by solar energy," Materials Today Energy 12 (2019): 277-296.

* cited by examiner

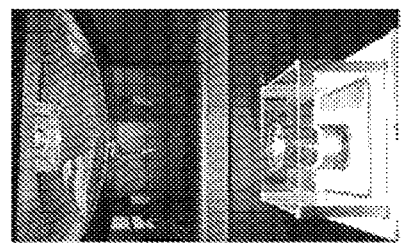
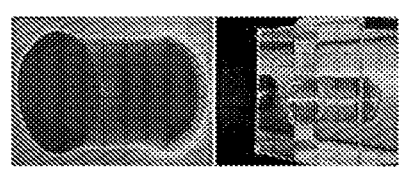
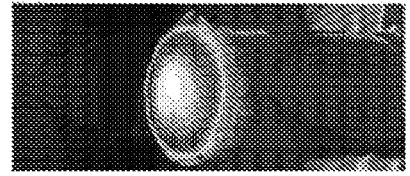
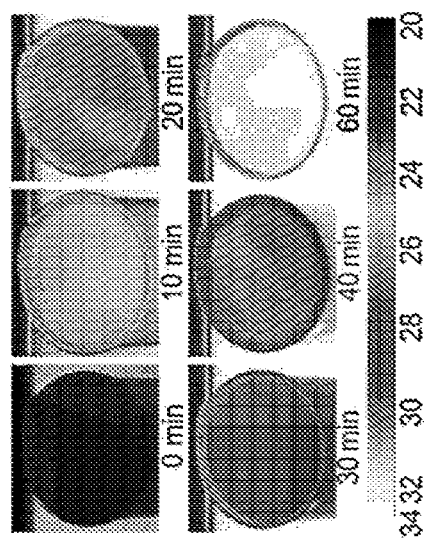
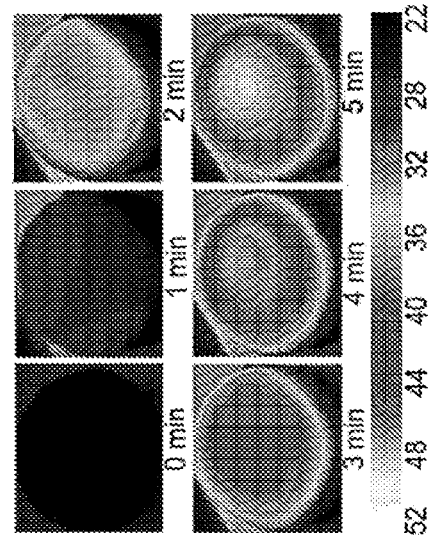
FIG. 4A
FIG. 4B

SOLAR-DRIVEN EVAPORATION DEVICE FOR DESALINATION SYSTEM

CROSS REFERENCE TO RELATED APPLICATION

This application is the US National Phase of International Application No. PCT/US21/45163 filed on Aug. 9, 2021, which claims priority from U.S. Provisional Patent Application No. 63/064,699 filed on Aug. 12, 2020 entitled NOVEL COST-EFFECTIVE HIGH-EFFICIENT SOLAR-DRIVEN WATER DESALINATION DEVICE. The entirety of each of these applications are hereby incorporated herein by reference.

GOVERNMENT SUPPORT

This invention was made with government support under Grant No. CBET-1941743 awarded by the National Science Foundation. The government has certain rights in the invention.

BACKGROUND

The present application relates generally to solar-driven steam generation enabled by an ultra-black paint and used, e.g., in water desalination and purification systems.

Access to freshwater is of pivotal importance to humanity. Fast population growth and climate change demand increasing supply of freshwater. Water scarcity has become a threat to the sustainable development of human society [1, 2]. This motivates the development of utilizing saline waters from the oceans and other brackish water sources and the processes that convert saltwater into freshwater. Solar energy is now emerging as one of the most promising sustainable energy sources, as it is clean and can be supplied without any environmental pollution compared with other forms of energy [3]. And the abundant solar energy makes the solar-driven evaporation one of the promising approaches for water desalination and purification.

In a conventional solar-driven evaporation system, bulk water is heated to a high temperature to generate water vapor, resulting in a slow response to sunlight and heat loss to the bulk water or the external environment [4, 5, 6, 7, 8]. In 2011, Wang et al. were among the first to demonstrate the floating interfacial solar-driven evaporation structure into desalination area, which does not require significant capital investment in high-cost permanent construction and/or land use [9]. Compared with the bulk water-heating method, which heats the entire body of water, the interfacial solar-driven evaporation approach mainly localizes the heat generation at the air/water interface. This method avoids heating a large volume of water, e.g., the ocean, which serves as a low-temperature sink. The interfacial evaporation has an ultra-fast response to sunlight and is endowed with a much higher systematic thermal efficiency [10, 11]. Furthermore, the technique can be easily applied by floating an absorber sheet on the water surface without complex pressure control or other bulky infrastructure. Owing to all these advantages, scientists have made great efforts to develop the interfacial solar-driven evaporation.

To yield a remarkable photothermal performance, the development of interfacial evaporation structure should center around the following four key factors: (1) The ideal solar absorber should possess outstanding absorptance in the range of visible and near-infrared regions [12] to convert the solar radiation into heat to be used for water vapor generation; (2) the interfacial evaporation should feature a low thermal conductivity, thereby reducing the heat loss from the absorber to the bulk water and localizing the heat at the air/water evaporative interface; (3) high hydrophilicity and porous framework should be used for sufficient water transport from the bulk water to the heated area; and (4) self-floating ability should be included to avoid land use and/or permanent infrastructure construction. Even with intensive efforts so far, it remains as a huge challenge to develop an approach that can satisfy these four criteria simultaneously.

To obtain a high efficiency, a multilayered structure is proposed to take into account these pivotal factors and it provide more options to choose alternative appropriate materials [13, 14, 15, 16, 17]. Ghasemi et al., first demonstrates the double-layered structure consisting of a carbon foam layer supporting an exfoliated graphite layer [15]. The bottom layer serves as a heat barrier to minimize the heat loss to the bulk water, and its porous structure is used to transport water to the heated area, and meanwhile it supports the top layer to make it possible for self-floating. The top porous layer serves as the absorber for the vapor transport.

Recently, many similar double-layered evaporation structures have been widely adopted. In most cases, such as air-laid paper [18], polystyrene foam [13], woodblock [19, 20, 21], polyurethane sponge [22], macro-porous silica substrate [23], and bacterial nanocellulose aerogel [24], the bottom layer serves both as a heat barrier and a water transport medium. Under a steady working condition, when water is transported to the top photothermal area through the bottom layer, almost all of the macropores inside the heat barrier are filled with water, which typically is more thermally conductive than the heat barrier. This process renders the heat barrier less effective. To avoid heat loss, a new multilayer consisting of photothermal material, closed-pore thermal insulator, and external hydrophilic materials has generated much interest. The closed-pore thermal insulator serves as a real heat barrier layer and the air inside the insulator reduces heat conduction. For example, polystyrene foam [17, 25, 26, 16, 27, 28] is a good and inexpensive thermal insulator with low thermal conductivity. External hydrophilic materials, wrapping or passing through the insulator foam, act as a capillary-driven pump with a one-/two-dimensional water path [29, 17]. By and large, this modified multilayered evaporation structure has become a favorable way to further minimize heat conduction losses and improve energy conversion efficiency.

Efficient solar steam generation depends highly on the photothermal conversion materials with broadband absorptance and high photothermal properties [30, 31]. On the basis of a multilayered structure, the diverse photothermal materials with wide light absorbance have been extensively studied including carbon-based materials [9, 15, 32, 33], metals [34, 35, 36, 37], and metal oxides [38, 39, 40, 41]. Carbon-based absorbers, such as carbon black [42], graphene [43], graphene oxide [17, 44, 24] and carbon nanotube [21, 23], offer great advantages of high solar absorbance and thermal stability. They have become the largely approving choices, however, the utilization of elaborate technologies and the high-associated cost limit their field applications to large-scale desalination [45, 6, 17]. Although the metal-based (e.g., gold nanoparticles) materials have attracted tremendous attention due to their unique optical and photothermal properties [46, 18, 47], their industrial applications are limited because of their inferior chemical and thermal stabilities, exorbitant cost, and complex fabrication processes.

BRIEF SUMMARY OF THE DISCLOSURE

A floatable interfacial solar-driven evaporation structure in accordance with one or more embodiments comprises a water impervious thermal insulation layer adapted to float on a body of water, a porous absorber layer on the water impervious thermal insulation layer, and an interlocked non-woven cotton fiber layer having a portion thereof between the water impervious insulation layer and the porous absorber layer and one or more additional portions configured to extend to the body of water to act as a capillary-driven pump to transport water from the body of water to the porous absorber layer. An ultra-black photothermal paint covers the exposed upper surface of the porous absorber layer to convert solar radiation impinging on the ultra-black photothermal paint into heat for use in generating water vapor from water in the porous absorber layer.

A floatable system for desalinating water from a body of water in accordance with one or more embodiments comprises an interfacial solar-driven evaporation structure and a condensation chamber to collect and condense the water vapor from the interfacial solar-driven evaporation structure into liquid water. The interfacial solar-driven evaporation structure comprises a water impervious thermal insulation layer adapted to float on the body of water, a porous absorber layer on the water impervious thermal insulation layer, and an interlocked non-woven cotton fiber layer having a portion thereof between the water impervious insulation layer and the porous absorber layer and one or more additional portions configured to extend to the body of water to act as a capillary-driven pump to transport water from the body of water to the porous absorber layer. An ultra-black photothermal paint covers the exposed upper surface of the porous absorber layer to convert solar radiation impinging on the ultra-black photothermal paint into heat for use in generating water vapor from water in the porous absorber layer.

BRIEF DESCRIPTION OF THE DRAWINGS

FIG. 4A shows (a) infrared (IR) thermal images of the top surface of a water-only beaker under one sun illumination over exposure time in the left section (b) IR thermal image and the photograph of the beaker filled with deionized (DI) water only under one sun after one hour in the middle section, and (c) photographs of the beaker filled with water only placed on an electrical balance under one sun illumination in the right section. FIG. 4B shows (a) IR thermal images of the evaporation device under one sun illumination in the initial 5 minutes in the left section, (b) IR thermal image of the evaporation device floated on water in the beaker under one sun illumination after one hour in the middle section, and (c) photographs of the beaker with the evaporation device placed on an electrical balance under one sun illumination in the right section.

DETAILED DESCRIPTION

Various embodiments disclosed herein relate to novel techniques and materials for improving evaporation efficiency and reducing costs for desalination processes. In one or more embodiments, a floating interfacial solar-driven evaporation structure is disclosed having an ultra-black paint (e.g., Black 3.0 paint) applied to a sheet of melamine foam (MF) serving as the photothermal conversion material. The sheet of MF is hot-pressed and forms an elastic skeleton material. It is sprayed with Black 3.0 paint forming a solar absorber that efficiently absorbs and converts solar radiation into heat to achieve high evaporation performance. The floating three-layer evaporation structure has a two-dimensional water path to localize solar-thermal heat generation to the air/water interface. This entire device can be made from commercially available low-cost materials. For example, the solar absorber comprises a sheet of hot-pressed MF covered with Black 3.0 paint, the two-dimensional water path is provided by the highly absorbent Webril all-cotton wipes, and the thermal barrier comprises the Polyvinyl chloride (PVC) foam. Under one sun illumination without solar concentration, this evaporation device yields an excellent evaporation rate of freshwater as high as 2.48 kg m$^{-2}$ h$^{-1}$ and a highlighted evaporation efficiency of 172.5%. The Black 3.0 paint enables the device to have superb performance, cost-effectiveness, operability, and durability, which are important to solar-driven evaporation devices.

Figure 1A:
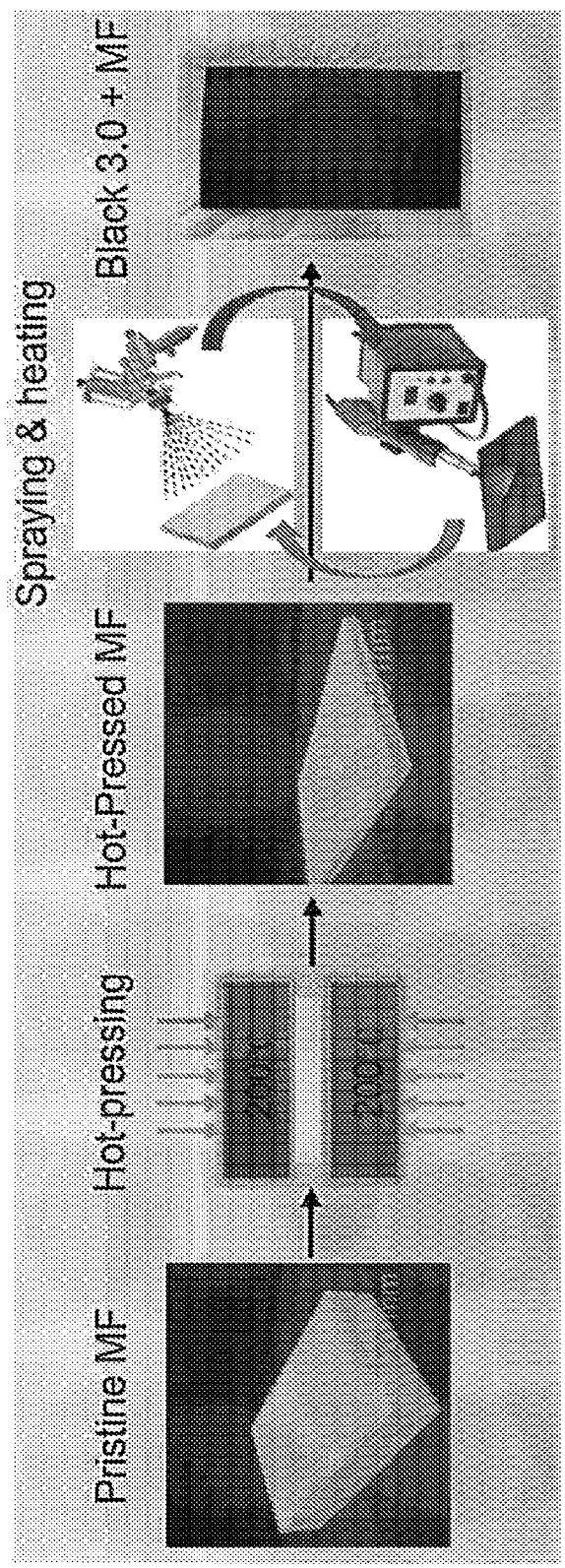
FIG. 1A illustrates the process of forming the black-sprayed hot-pressed melamine foam (MF) based absorber layer of a floating interfacial solar-driven evaporation device in accordance with one or more embodiments.

FIG. 1A illustrates the process of forming the absorber layer of a floating interfacial solar-driven evaporation structure in accordance with one or more embodiments. The fabrication process is simple and scalable. It includes the steps of hot-pressing MF, spraying the hot-pressed MF with Black 3.0 paint, and drying it. In one example, MF with the dimension of 10 cm×6 cm×2 cm is selected as an elastic skeleton for supporting the Black 3.0 paint spray. MF is a commercially available low-cost polymer material, and its high porosity, low density, excellent hydrophilicity, and elasticity render it highly useful for the solar steam generation devices [45, 48]. Hot-pressing treatment of the MF with a compression ratio of 4 has been found to be advantageous to increase its elasticity and fatigue resistance. More importantly, the compressed three-dimensional network of the foam can dramatically increase its density to effectively increase the ability of water absorption. In laboratory experiments, the pressed MF is cut into a 1 mm-thick circle with a diameter of 47 mm, fitting the size of a 100 ml beaker.

The inexpensive Black 3.0 paint has gained great attention in creative art. It is superb as a solar photothermal material. As the blackest and most matte acrylic paint, Black 3.0 paint exhibits nearly perfect solar absorption at up to 99% of visible light. The paint can be easily applied via brushing or spraying onto most surfaces, such as wood, paper, canvas, and plastic. The paint is light in density and very suitable to the desalination process.

In one exemplary embodiment, ultra-black photothermal paint absorbs at least 99% of visible lights (0.38-0.75 micrometers) and absorbs 97.5% of near-infrared lights (0.75-3 micrometers).

In one exemplary embodiment, the cotton wipe layer comprises an interlocked non-woven cotton fiber layer with an average fiber size of about 15 micrometers and comprising the chemical groups of —OH, —CH3, —CH2, and —C=O.

Figures 1B, 1C:
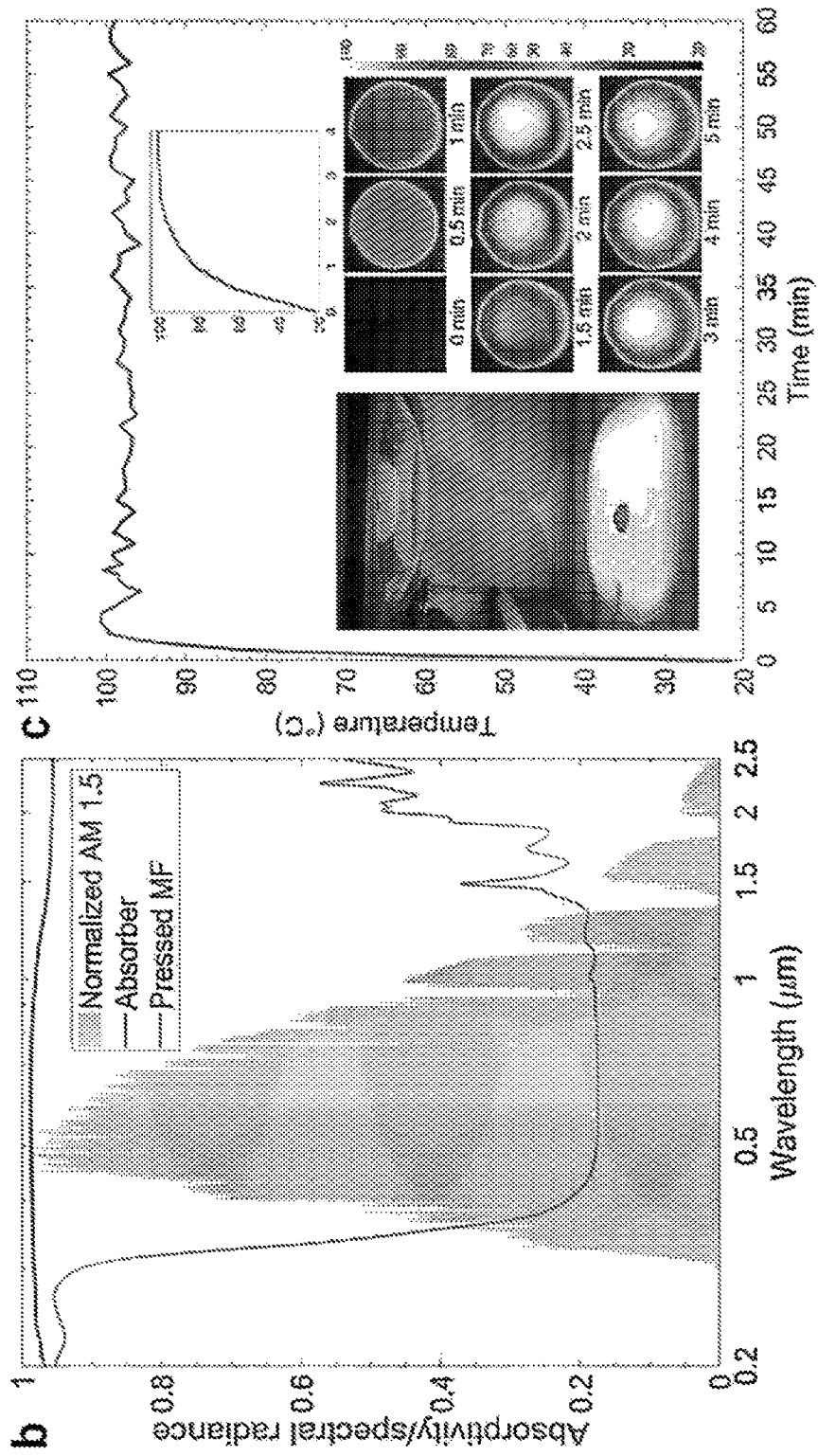
FIG. 1B is a graph showing UV-Visible-Near-infrared absorptivity spectra of the absorber layer, the hot-pressed MF, and the normalized spectral solar irradiance density of air mass 1.5 (AM 1.5 G) global tilt solar spectrum.
FIG. 1C is a graph showing the temperature of the absorber sheet over time under one sun.

FIG. 1B shows the transmittance spectrum of the Black 3.0 paint hydraulic pressed with KBr powder showing corresponding wavenumber of functional groups. Then the diluted paint is sprayed on the pressed MF sheet using a spray gun. The distance between the spray head and the MF sheet is about 25 cm. Considering the porous surface of the pressed MF sheet surface, it has been found that a couple of thin coating layers are better than one the thick layer. Between each coating process, drying it thoroughly with hot air is useful at 190° C. for 5 minutes. After thorough drying, the Black 3.0 paint-coated MF sheet is rinsed in deionized (DI) water for several times to remove the residual impurities. This sheet is then kept in the oven at 60° C. for drying and then used it as the solar absorber layer in the evaporation device. The absorber layer can be easily prepared requiring no complex process or expensive equipment, and therefore, suitable for volume production. As shown in FIG. 1B, the absorber sheet exhibits a superb absorption ranging from 95% to 99% at the wavelength from 0.2 µm to 2.5 µm, indicating that it acts as an efficient broadband solar radiation absorber, whereas the pure pressed MF shows poor absorptivity. The absorber also exhibits an angular-independent hemispherical absorptivity.

FIG. 1C shows the surface temperature of the absorber sheet in the air under one sun for an hour. The time-dependent temperature changes and images are captured by an infrared camera at room temperature, displaying the maximum temperature of the sheet over time. In taking the temperature measurement, the tested absorber sample is placed on a PVC foam plate to minimize the heat exchange with the base below. Upon light illumination, the surface temperature of the absorber sheet rises sharply to an equilibrium temperature around 100° C. within the initial 2.5 minutes and then varies slightly around this temperature afterward, indicating an excellent photothermal performance of the absorber sheet. The inset of FIG. 1C demonstrates the change in surface temperature more clearly in the initial 4 minutes.

Figure 2A:
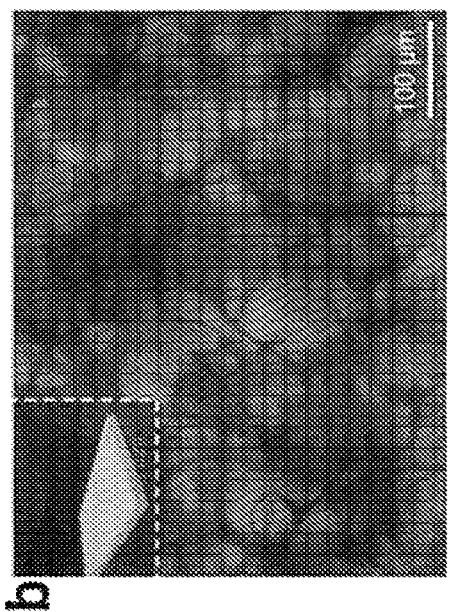
FIGS. 2A-2D are microscope images of (a) pristine MF, (b) pressed MF, (c) one-layer paint coated MF, and (d) three-layer paint coated MF, respectively. The insets are photographs of the pristine/hot-pressed, one-/three-layer paint coated MFs.
Figure 2B:
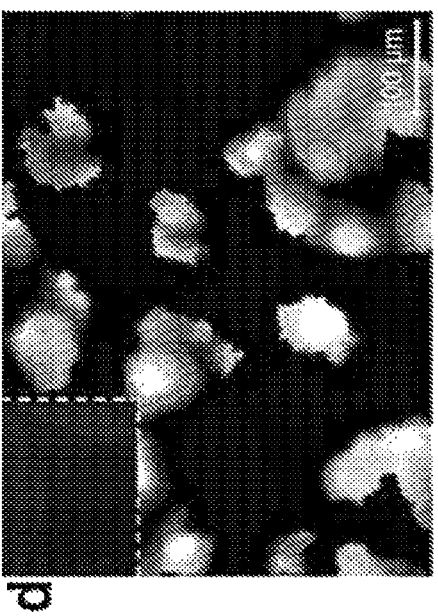
Figure 2C:
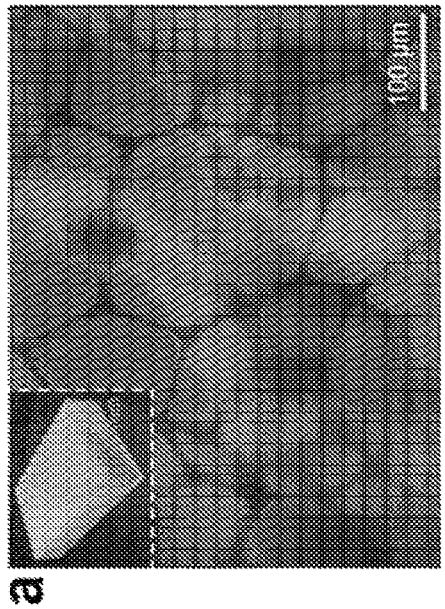
Figure 2D:
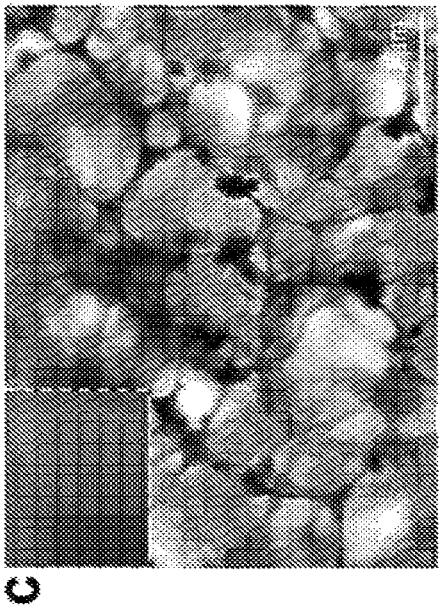
Figure 2E:
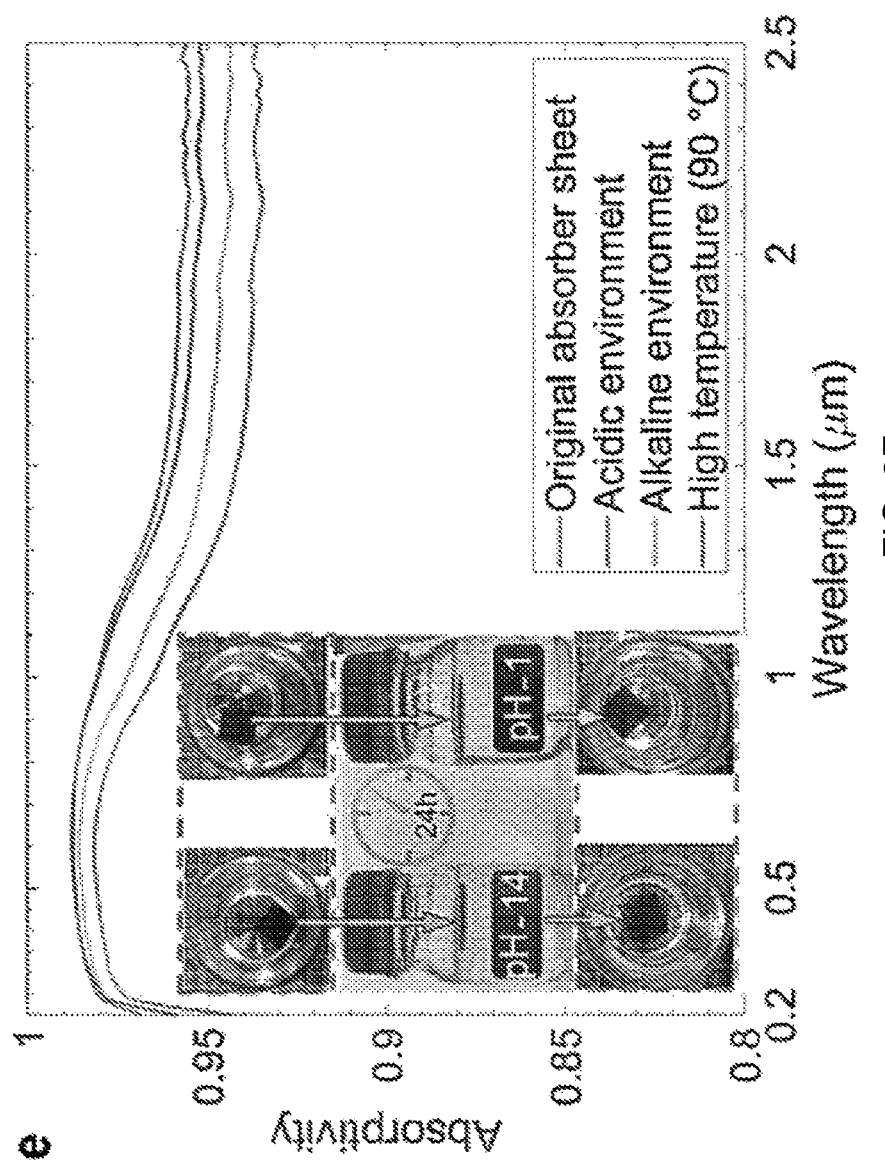
FIG. 2E is a graph showing the UV-Visible-Near-infrared absorptivity spectra measurement and the chemical stability tests of the absorber layer under different harsh environments. The inset shows the absorber layer is immersed in an alkaline solution (pH~14) and acidic solution (pH~1) for 24 hours in the sealed bottles.

FIGS. 2A-2D show the microscopic structures of the absorber. The pristine MF has polygon networks with a size of about 200 µm and the diameter of the fibers is around 7 µm (FIG. 2A). While the geometric shape of the networks collapses with the reduced network size (FIG. 2B), it retains its porous structure, enabling the transportation of water. One-layer Black 3.0 paint coating forms the beads along the fibers (FIG. 2C), and the three-layer coating causes an increase in the fiber diameter from 7 µm to 50 µm (FIG. 2D) and fully-covered Black 3.0 paint coated MF presents nearly unity absorptivity in solar irradiance region. The fully covered MF still keeps a highly-porous structure facilitating the water transport and vapor release, which results in the high water evaporation rate. To evaluate the stability of the absorber sheet, the absorber layers underwent severe tests, kept in the boiling water (around 90° C.) for 1 hour and immersed in the alkaline solution (pH~14) and acidic solution (pH~1) for 24 hours in the closed bottles. After this harsh thermal and chemical stability test, no obvious changes in the appearance were observed and their absorption spectra are basically consistent with the original absorber sheet (FIG. 2E).

Figures 3A, 3B:
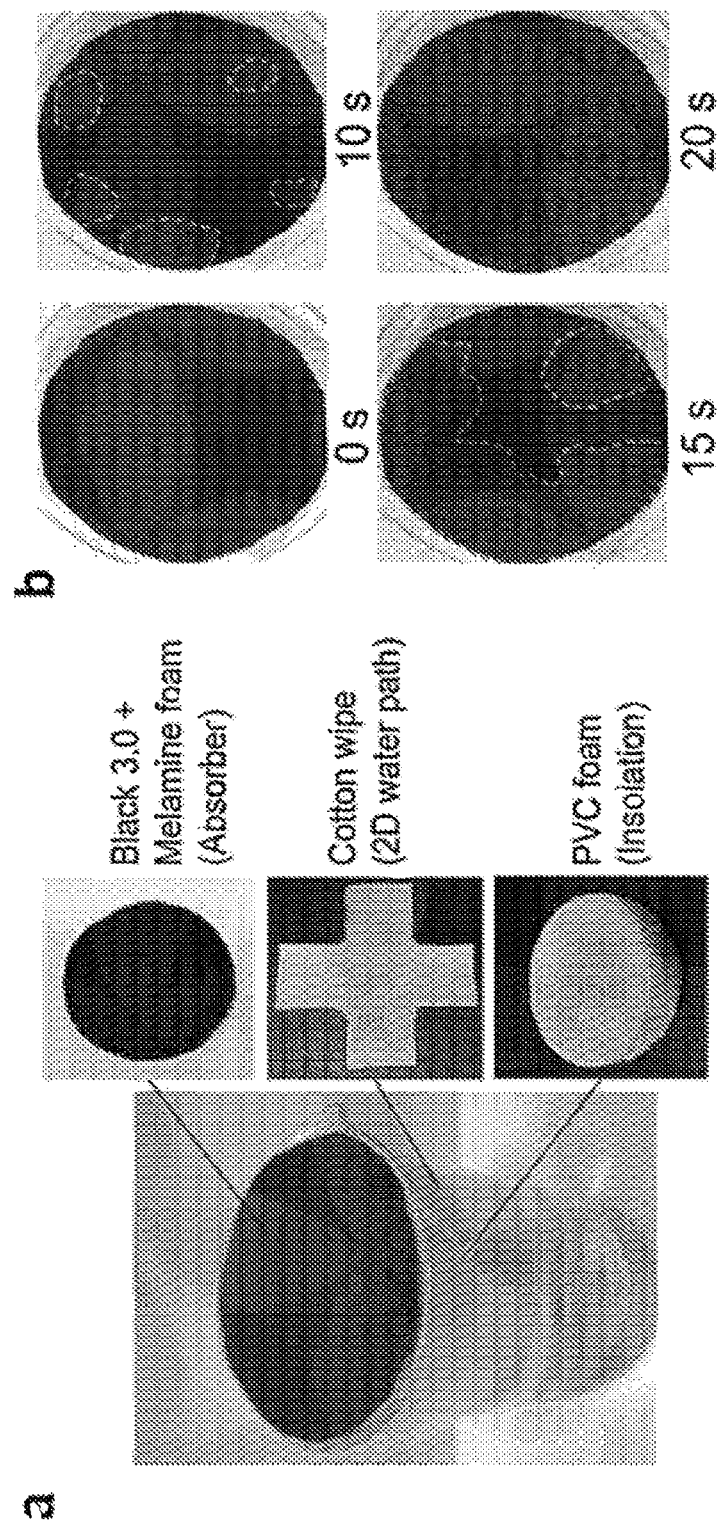
FIG. 3A shows photographs of the three-layer evaporation structure placed in a beaker filled with freshwater.
FIG. 3B shows photographs illustrating the wetting process of the evaporation device placed on the surface of the water. The dash enclosed regions exhibit the wetting areas.

Localizing the heat converted from solar energy to the air/water interface allows high evaporation performance to be achieved. FIG. 3A illustrates an exemplary self-floating evaporation device structure in accordance with one or more embodiments, which is composed of three layers. The top layer is a solar absorber layer made of the MF sheet combined with Black 3.0 paint, which plays an important role in the efficient absorption of the solar radiation. Beneath the absorber layer is a two-dimensional water path enabled by a cotton wipe that is cut into the shape of a circle with four extended strips. The round central area of the cotton wipe is kept the same as the absorber area, and the bottom edges of four strips are in direct contact with the bulk water, which decreases the contact area between the evaporation surface and the bulk water. The cotton wipe is used to transport water due to its strong capillary force and to reduce the direct contact between the bulk water and the absorber layer. This simultaneously allows efficient water supply to the solar heating area and minimizes the heat dissipation to the bulk water, which enables high-efficiency interfacial evaporation to be achieved. The interlocked fibers of cotton wipe do not come apart when soaked in water for extended periods of time, which contributes to the durability and stability of the device. During operation, the cotton wipe pumps the bulk water towards the heating surface through the four strips around the floating foam relying on its strong capillary wicking effect. The bottom layer is the thermal insulation wrapped with the cotton water path. The thermal insulation is made from PVC foam with only closed pores, which are impermeable to water, and its low thermal conductivity (~0.03 W m$^{-1}$ K$^{-1}$) reduces downward thermal dissipation from the evaporation surface. Due the low density of the thermal insulation and the simple structure of the whole device, the evaporation device can be placed on the water and move together with a wavy water surface, achieving self-floating for continuous operation.

The surface wettability of the evaporation device also plays an important role in the steam generation process. As shown in FIG. 3B, the evaporation device is placed in a beaker filled with DI water at the initial temperature of 21° C., and its wetting process is recorded from the top view. The water immediately reaches the surface of the absorber layer from the regional edge (the enclosed areas in the blue dashed), and then the wet area quickly expands to the central area until it covers the entire evaporation surface. The surface wettability owes much to forceful hydrophilicity of the two-dimensional water path of the cotton and the porous structure of the absorber layer, which assures ample water supply to the evaporation surface.

Figure 3C:
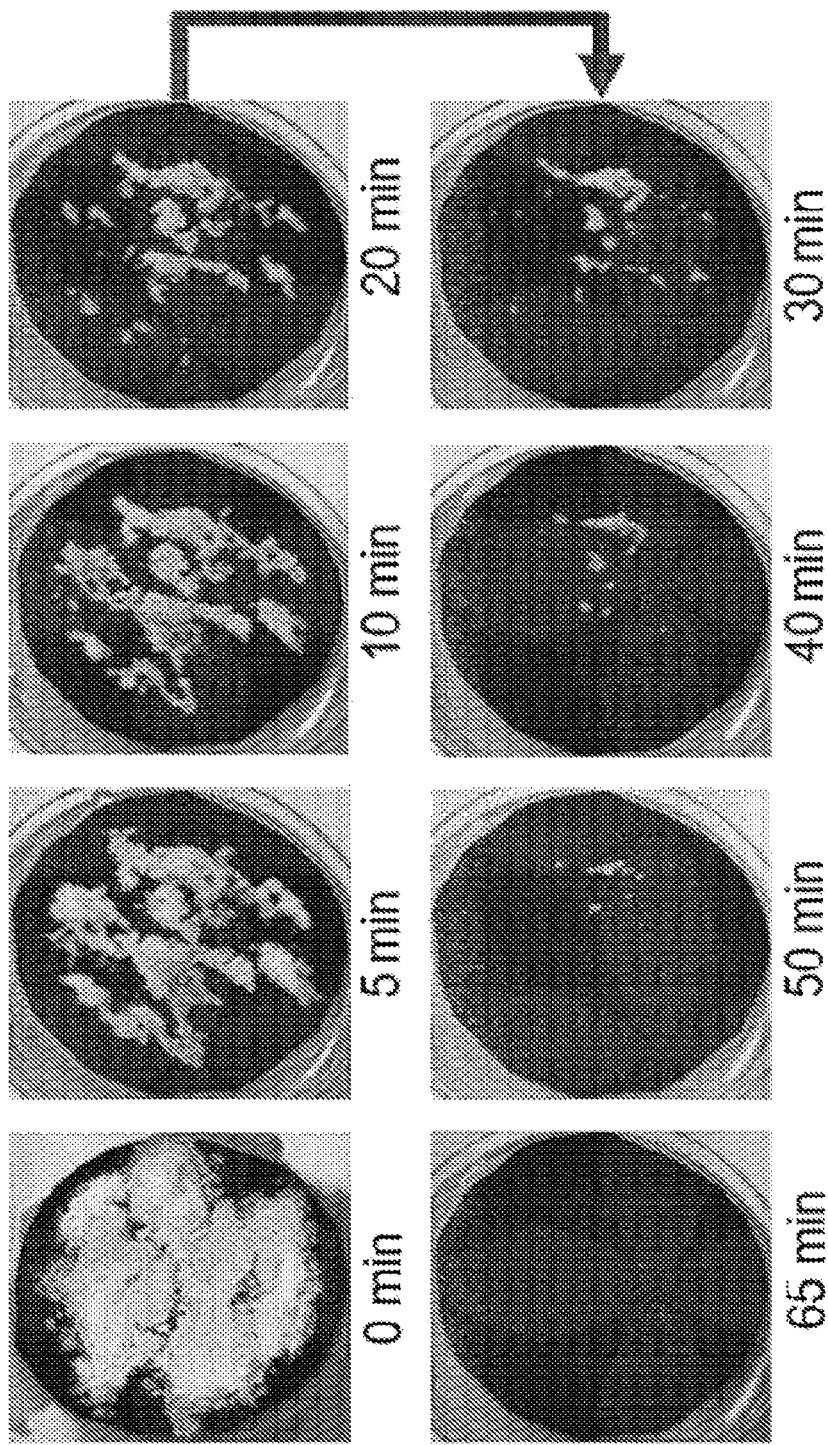
FIG. 3C shows photographs of the salt rejection progress of the evaporation device. The evaporation device is placed in a beaker filled with 3.5 wt % NaCl solution, and NaCl is originally stacked on the top surface of the absorber.

Salt accumulation in the evaporation device should be avoided for a self-floating solar evaporation structure utilizing heat localization [16]. FIG. 3C shows the progression of salt dissolution, which demonstrates the salt rejection ability of the three-layer device. In this experiment, a three-layer structure with a diameter of 47 mm floated in a 100 ml beaker of 132 g 3.5 wt % NaCl solution with 21° C. initial temperature. 1.7 g of additional solid NaCl is placed directly on the top of the absorber surface. Upon contact with water, the solid NaCl on top starts to dissolve due to the movement and exchange of solution inside the absorber layer and two-dimensional water path between the device surface and the bulk water below the insulation. After approximately 65 minutes, the three-layer device fully rejects the salt, which indicates a good salt rejection ability.

The steam generation ability of the evaporation device at a laboratory scale is tested combining an irradiation system to simulate the solar radiation, a weighing system monitoring the mass change of water in a beaker during a certain period of irradiation, and an infrared camera monitoring the real-time temperature. Both 3.5 wt % NaCl solution and DI water were prepared to maintain an initial temperature at 21° C. in the 100 ml beakers. The evaporation device is floated on water in the beaker filled with 127 g of water. Beneath the beaker is an electronic balance connected to the computer. The simulated solar radiation was provided by a solar simulator. When the illumination began, the solar steam generation was determined by the balance, and the real-time temperature of the absorber sheet and water surface were monitored by an infrared camera. The laboratory temperature and humidity were kept at about 22° C. and 21%, respectively.

Figures 4C, 4D:
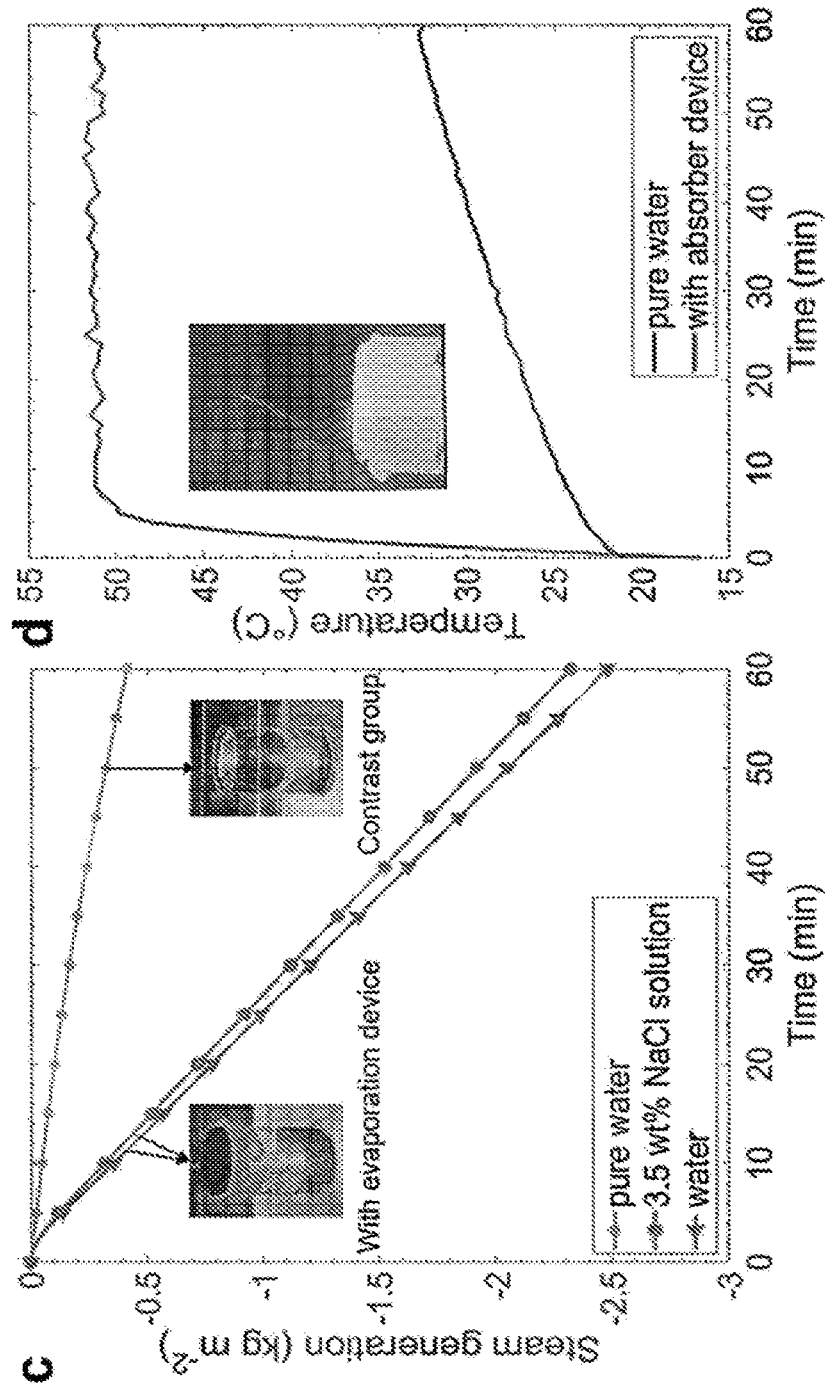
FIG. 4C is a graph showing the change of mass of water over time of DI water only and with the evaporation device placed at the interfaces of the DI water, and 3.5 wt % NaCl solution.
FIG. 4D is a graph showing the maximum temperature profiles of the pure water surface and the absorber layer under one sun illumination over exposure time. The inset is a visible steam flow generated under one sun irradiation.

FIGS. 4A-4D compare the surface temperatures of pure water and 3.5 wt % NaCl solution with and without the evaporation device under one sun illumination. The temperature data and images are captured by an infrared camera. FIG. 4A shows the surface temperature distribution of the beaker filled with water without the evaporation device over the irradiation time. The surface temperature rises slowly under irradiation due to the poor light harvesting efficiency and its maximum temperature profile shown in FIG. 4D slopes gently from the initial temperature of 21° C. to 32° C. for an hour. By contrast, upon light illumination, the temperature of the absorber layer rises sharply to an equilibrium temperature around 50° C., indicating good photothermal performance. As shown in FIG. 4C, for the water only experiment, the steam generation rate is measured to be 0.41 kg m$^{-2}$ h$^{-1}$ under one sun irradiation (1 kW m$^{-2}$). By contrast, the steam generation rate of evaporation device in DI water reaches up to 2.48 kg m$^{-2}$ h$^{-1}$ under the same experimental conditions, 6.04 times higher than that of pure water. Most significantly, when the evaporation device floats on 3.5 wt % NaCl solution, it has a comparable steam generation rate of 2.32 kg m-2 h-1, 5.65 times higher than that of pure water. Evaporation efficiency, $n_{evap}=\dot{m}h_{fg}/Q_s$, is an important parameter to evaluate the steam generation performance, where m is the water evaporation rate (kg m$^{-2}$ h$^{-1}$), $Q_s$ is the power density of irradiation (kW m$^{-2}$), and $h_{fg}$ is the total enthalpy of vaporization of water (kJ kg$^{-1}$). In particular, $h_{fg}$ is the sum of the sensible heat (121.26 kJ kg$^{-1}$) and the temperature-dependent enthalpy of vaporization (2382.7 kJ kg') in this text. Thus, we obtain $n_{evap}$=172.5% under one sun illumination.

Figures 5A, 5B:
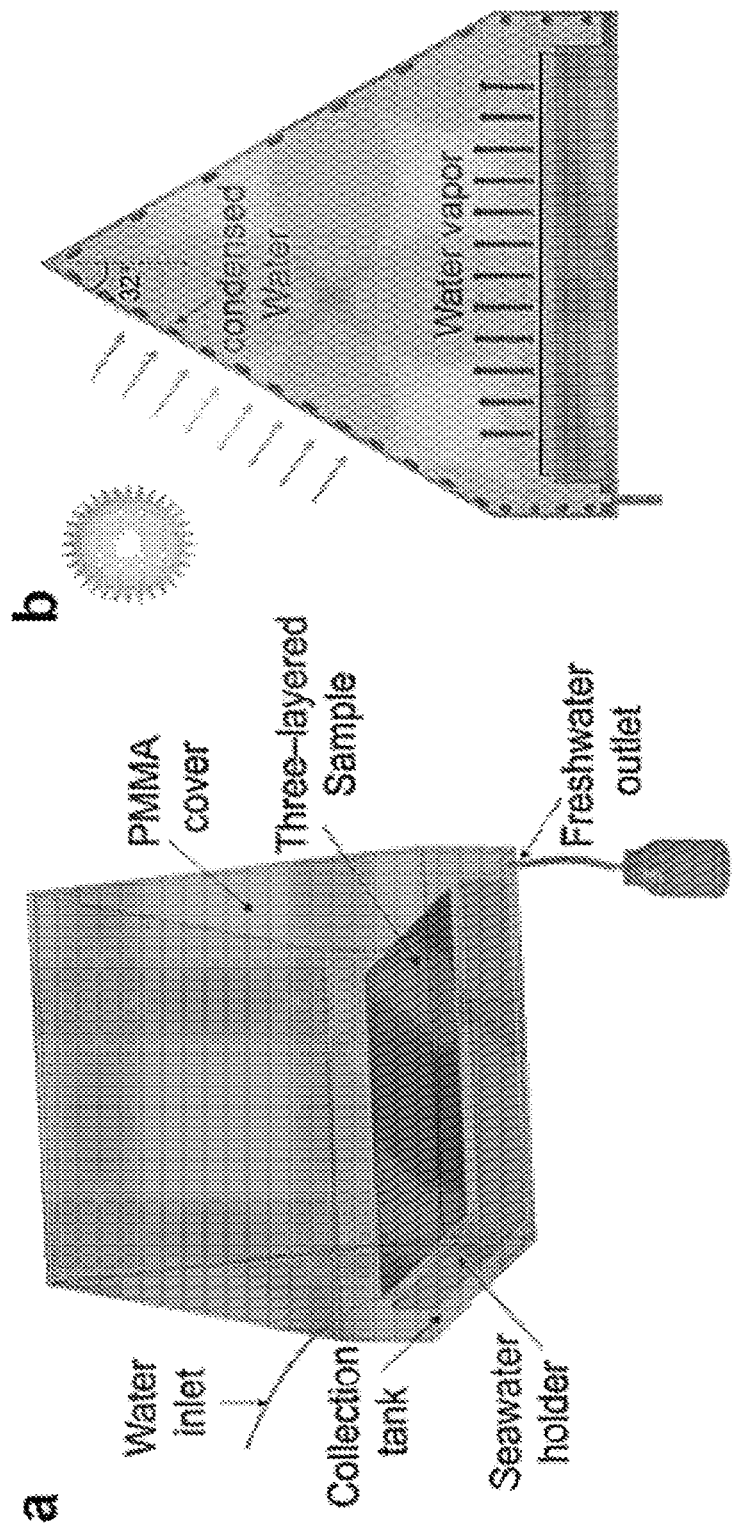
FIG. 5A illustrates a three-dimensional model of a solar desalination system including an interfacial solar-driven evaporation device in accordance with one or more embodiments. The system has a PMMA condensation cover in the dimension of 30 cm×30 cm for desalination.
FIG. 5B illustrates operation of the solar desalination system.
Figure 5C:
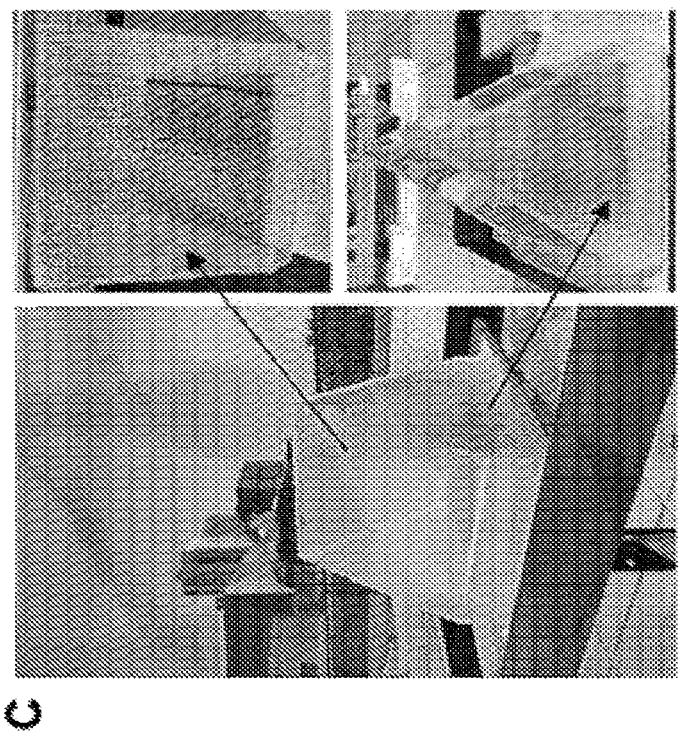
FIG. 5C shows photographs of the desalination system placed on a utility cart (left side) and dense condensed water droplets on the interior surface of the condensation cover and sidewall (right side) during experimentation.
Figures 5D, 5E:
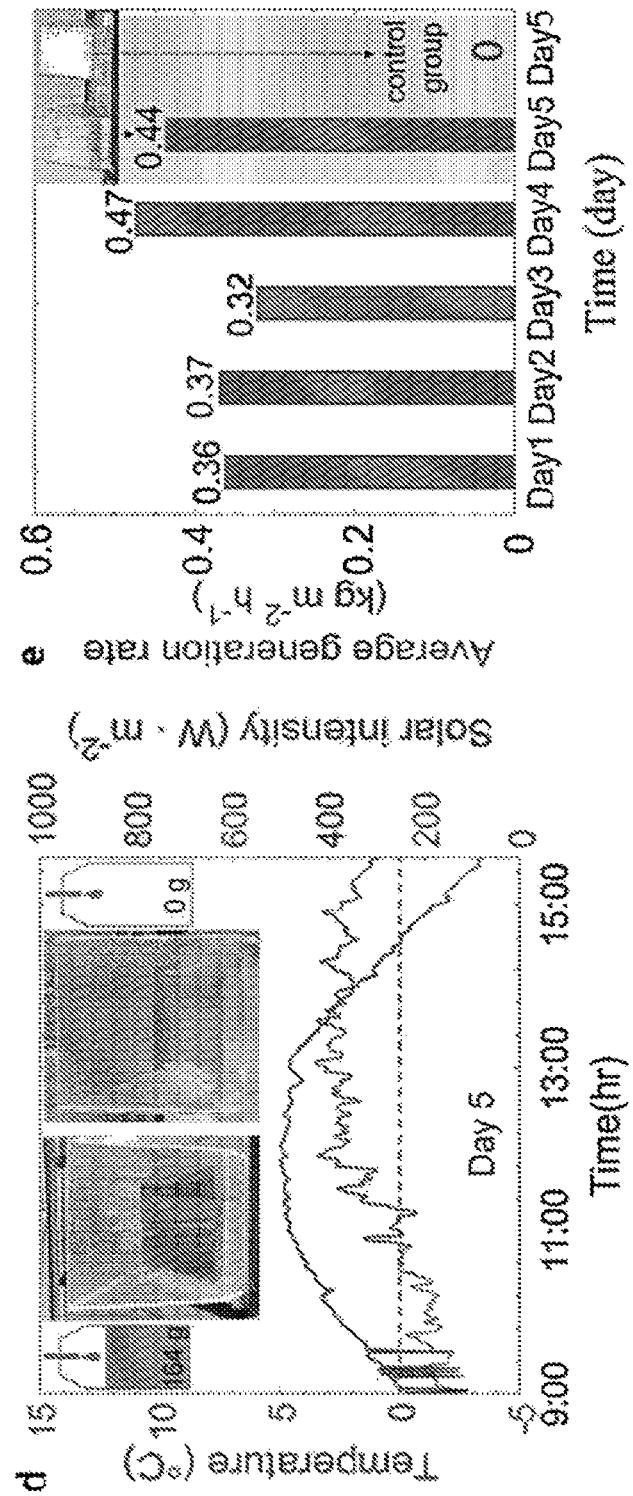
FIG. 5D is a graph showing the contrast experiment with an evaporation device (left inset) and without (right inset) on Day 5 of the experiment. The blue and red curves show the change of ambient temperature (left y-axis) and the solar intensity (right y-axis). Two bottles in insets show the weight of the collected water from the contrast experiment.
FIG. 5E is a graph showing the averaged outdoor steam generation rates of the 3.5 wt % NaCl solutions for 5 days in January 2020.

We have performed field test of this evaporation device to demonstrate the feasibility of scalable production of freshwater. We constructed a prototype of the evaporation system with a condensation chamber and an evaporation device of a large area of the absorber (24 cm×24 cm) inside, as shown in FIGS. 5A-5C. The condensation chamber made of Polymethyl methacrylate (PMMA) board surrounds the entire evaporation device to capture condensate of the evaporated steam. According to the transmission spectrum of the PMMA board, shown in FIG. 5D, the condensation structure is well transparent in the solar spectrum to allow the solar irradiance to reach the evaporation device, while it is opaque in the mid-infrared region to confine the infrared emission of the evaporation device inside the chamber to contribute to maintaining a relatively higher evaporation temperature. As shown in FIG. 5B, the tilted angle of the condensation cover in the dimension of 30 cm×30 cm is fixed to be 32° considering the latitude of Boston city, allowing the solar flux to reach the evaporator without refraction. The photograph of FIG. 5C shows the prototype is placed on the polystyrene foam with a low thermal conductivity to reduce the thermal flux between the bottom of the prototype and the utility cart, and the condensed water is observed on the condensation cover (FIG. 5E). The condensed water droplets fall to the collection tank and eventually flow to a chemical storage bottle. It has been confirmed that the sodium concentration of the desalinated water is 5 mg l$^{-1}$, which is much lower than the standard of the drinkable water specified by the World Health Organization (WHO) [49]. The validated prototype is tested on the roof of Snell Engineering Center at Northeastern University, Boston, MA, USA, and water collections are measured over 5 days in January 2020. The specific experiment dates, instantaneous incident sunlight, ambient temperature, wind speed, and humidity are recorded and provided in the supplementary materials. The 3.5 wt % NaCl solution, which simulates the average salinity of seawater all over the world, is used during the field test and the seawater holder is filled up through the water injection tube after the daily use.

The average evaporation rate of drinkable freshwater, shown in FIG. 5E, varies from 0.32 kg m$^{-2}$ h$^{-1}$ to 0.47 kg$^{m-2}$ h$^{-1}$ under various solar intensity and ambient temperature conditions. The experiment data and detailed weather condition data are provided in FIGS. 5D and 5E. To demonstrate the promising solar steam generation ability of this evaporation system, the prototype, and the control group, the same condensation chamber without a three-layer evaporation device inside was conducted for a contrast experiment on day 5 (FIG. 5D). At the end of the experiment, 164 g of water was collected from the prototype, while the control group collects nearly zero water in the same-day operation. In the rooftop experiments, it is well noted that the weight of collected freshwater refers to the weight of water in the chemical storage bottle, not exactly the weight of condensed water produced. The inset of FIG. 5D shows the end state of the contrast experiment. In the control group, dense condensed water droplets can be observed on the cover without forming the water dripping flow. On day 4, the daily condensate rate (2.83 kg m$^{-2}$ d$^{-1}$) in winter produced from the evaporation device of the area of 0.0576 m$^{-2}$ is comparable to a previous work (2.81 kg m$^{-2}$ d$^{-1}$) in the summer [16], which proves a reliable and scalable production of freshwater using our design in four seasons.

We have demonstrated a high-performance, low cost, and simple interfacial three-layer steam generation device based on the novel commercial Black 3.0 paint, which is applied for the first time to the solar steam generation as a photothermal material. Black 3.0 paint sprayed on a sheet of MF serves as the top solar absorber layer that can widely absorb the solar radiation and efficiently convert it into heat. The absorber layer, which is placed on a PVC foam plane under one sun irradiation, shows a significant temperature gradient and reaches up to 100° C. of equilibrium temperature. The absorber has strong thermal and chemical stabilities under harsh environments, and exhibits a remarkable salt rejection ability. All these performance capabilities contribute to use in a long-term durable steam generation process. In the laboratory experiments, enabled by the assistance of the low thermal conductivity PVC foam to reduce the heat loss and the cotton wipe to provide sufficient water through a two-dimensional water path to the heating region, the evaporation device has shown a steam generation rate of 2.48 kg m$^{-2}$ h$^{-1}$, 6.04 times higher than the natural evaporation. It has also shown an evaporation efficiency of 172.5% under one sun irradiation at the room temperature, surpassing most of the reported work. Even in a rooftop experiment during a cloudy winter day in Boston, MA with the maximum environment temperature of 4° C., 2.83 kg m$^{-2}$ d$^{-1}$ of water was collected. This simple, low cost, and easy to manufacture evaporation device can be highly beneficial to large-scale water desalination and purification applications.

The commercial MF used in the exemplary devices was purchased from South Street Designs company (UPC: 089902974060) with the dimensions of 10 cm×6 cm×2 cm ($0.3/piece). The Black 3.0 paint was purchased on the Culture Hustle ($0.146/ml). The Webril pure cotton wipe used had a size of 0.2 m×0.2 m ($2.99/m$^2$). The PVC foam insulator sheet was purchased from the McMaster-Carr with the dimension of 813 mm×1219 mm×13 mm ($58.7/m$^2$).

By way of example, the solar absorber layer can be fabricated as follows: pristine MF is thoroughly washed several times with ethanol and deionized (DI) water and then put in an oven kept at 60° C. in preparation for the hot-pressing treatment. After it is completely dried, the MF is pressed at 200° C. for 6 minutes with a compression ratio of 4, which is the height ratio of pristine MF to hot-pressed MF. Serving as the skeleton of the absorber, hot-pressed MF is cut into the desired shape with a thickness of about 1 mm. Black 3.0 paint is thinned with DI water under vigorous stirring for 5 minutes with a paintbrush, which helps to get a homogeneous mixture. The mass ratio of DI water to Black 3.0 paint is kept in the range of 0.35~0.4 in the dilution process. Subsequently, the diluted Black 3.0 paint is sprayed onto the MF sheet by a touch-up spray gun (e.g., from Paasche Airbrush, USA) with a 0.8 mm spray head at the pressure of 70 psi. The distance between the spray head and the MF sheet is about 25 cm. It has been found that 3 or 4 thin layers is much better than a single thick layer. The paint is dried between each spraying with a hot air blower (e.g., from Yihua Electronic Equipment Co., Ltd, Guangzhou, China) at a temperature of 190° C. for 5 minutes. This drying time is suitable for the specific dimensions of the samples disclosed herein.

A piece of PVC foam (47 mm in diameter and 13 mm in thickness) is utilized as the thermal insulator. Webril pure cotton wipe is cut into a 47 mm circle with four extended strips of 30 mm in width and 20 mm in length. The hydrophilic cotton wipe wrapped around the PVC foam with the four strips tip soaking in the bulk water ensures that the water reaches the upper circular area due to capillary force. Then, the MF sheet is placed over the circular area of the cotton wipe.

The steam generation experiments in the lab were carried out under a solar simulator (Newport, 94081A, class ABB), which supplies solar flux of 1 kW m' with an optical filter for the standard AM 1.5 G spectrum. 127 g of DI water and seawater (3.5 wt % NaCl) were prepared at the same initial temperature of 21° C. and placed in the 100 ml beakers with a mouth diameter of 50 mm. The steam generation device was floated on the solution surface and the mass of water was accurately monitored by an electric balance (RAD-WAG, PS 1000.X2.NTEP) connected to a computer for recording the real-time mass change. The real-time temperature was monitored by an infrared radiation camera (FLIR, A655sc).

The microscope images were obtained by using Metallurgical Microscope (AmScope, ME520TC-18M3) in the darkfield mode. The reflectivity spectra (UV-Visible-Near-infrared range: 200 nm~2500 nm) were measured by the Jasco V770 spectrophotometer at an incident angle of 6° with the ISN-923 60 mm BaSO4 based integrating sphere equipped with PMT and PbS detectors. The reflectivity spectra are normalized by a PTFE based reflectance standard. The transmittance spectra (Mid-infrared region: 2.5 μm~20 μm) were measured by the Jasco FTIR 6600 spectrometer at a normal incident angle with reference to the background spectrum of a hydraulic pressed KBr film (20 psi). The Extech EC400 ExStik salinity meter was utilized to characterize the water quality of the collected water samples.

In the exemplary embodiments disclosed herein, Black 3.0 paint is disclosed as the ultra-black paint. Other types of ultra-black paint can also be used including, e.g., cuttlefish or squid ink. Pure cuttlefish (or squid) ink powder can be purchased, e.g., from Fluxias GmbH Ltd, Germany.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

REFERENCES

[1] M. M. Mekonnen and A. Y. Hoekstra, "Four billion people facing severe water scarcity," Science advances, vol. 2, no. 2, p. e1500323, 2016.

[2] J. H. Reif and W. Alhalabi, "Solar-thermal powered desalination: Its significant challenges and potential," Renewable and Sustainable Energy Reviews, vol. 48, pp. 152-165, 2015.
[3] S. A. Kalogirou, "Solar thermal collectors and applications," Progress in energy and combustion science, vol. 30, no. 3, pp. 231-295, 2004.
[4] A. Kabeel and S. El-Agouz, "Review of researches and developments on solar stills," Desalination, vol. 276, no. 1-3, pp. 1-12, 2011.
[5] O. Neumann, A. S. Urban, J. Day, S. Lal, P. Nordlander, and N. J. Halas, "Solar vapor generation enabled by nanoparticles," ACS nano, vol. 7, no. 1, pp. 42-49, 2012.
[6] P. Tao, G. Ni, C. Song, W. Shang, J. Wu, J. Zhu, G. Chen, and T. Deng, "Solar-driven interfacial evaporation," Nature energy, vol. 3, no. 12, pp. 1031-1041, 2018.
[7] A. Lenert and E. N. Wang, "Optimization of nanofluid volumetric receivers for solar thermal energy conversion," Solar Energy, vol. 86, no. 1, pp. 253-265, 2012.
[8] N. J. Hogan, A. S. Urban, C. Ayala-Orozco, A. Pimpinelli, P. Nordlander, and N. J. Halas, "Nanoparticles heat through light localization," Nano letters, vol. 14, no. 8, pp. 4640-4645, 2014.
[9] Y. Zeng, J. Yao, B. A. Horri, K. Wang, Y. Wu, D. Li, and H. Wang, "Solar evaporation enhancement using floating light-absorbing magnetic particles," Energy & Environmental Science, vol. 4, no. 10, pp. 4074-4078, 2011.
[10] P. Wang, "Emerging investigator series: the rise of nano-enabled photothermal materials for water evaporation and clean water production by sunlight," Environmental Science: Nano, vol. 5, no. 5, pp. 1078-1089, 2018.
[11] Z. Wang, Y. Liu, P. Tao, Q. Shen, N. Yi, F. Zhang, Q. Liu, C. Song, D. Zhang, W. Shang, et al., "Bio-inspired evaporation through plasmonic film of nanoparticles at the air-water interface," Small, vol. 10, no. 16, pp. 3234-3239, 2014.
[12] P. Zhang, J. Li, L. Lv, Y. Zhao, and L. Qu, "Vertically aligned graphene sheets membrane for highly efficient solar thermal generation of clean water," Acs Nano, vol. 11, no. 5, pp. 5087-5093, 2017.
[13] L. Shi, Y. Wang, L. Zhang, and P. Wang, "Rational design of a bi-layered reduced graphene oxide film on polystyrene foam for solar-driven interfacial water evaporation," Journal of Materials Chemistry A, vol. 5, no. 31, pp. 16212-16219, 2017.
[14] J. Lou, Y. Liu, Z. Wang, D. Zhao, C. Song, J. Wu, N. Dasgupta, W. Zhang, D. Zhang, P. Tao, et al., "Bioinspired multifunctional paper-based rgo composites for solar-driven clean water generation," ACS applied materials & interfaces, vol. 8, no. 23, pp. 14628-14636, 2016.
[15] H. Ghasemi, G. Ni, A. M. Marconnet, J. Loomis, S. Yerci, N. Miljkovic, and G. Chen, "Solar steam generation by heat localization," Nature communications, vol. 5, p. 4449, 2014.
[16] G. Ni, S. H. Zandavi, S. M. Javid, S. V. Boriskina, T. A. Cooper, and G. Chen, "A salt-rejecting floating solar still for low-cost desalination," Energy & Environmental Science, vol. 11, no. 6, pp. 1510-1519, 2018.
[17] X. Li, W. Xu, M. Tang, L. Zhou, B. Zhu, S. Zhu, and J. Zhu, "Graphene oxide-based efficient and scalable solar desalination under one sun with a confined 2 d water path," Proceedings of the National Academy of Sciences, vol. 113, no. 49, pp. 13953-13958, 2016.
[18] Y. Liu, S. Yu, R. Feng, A. Bernard, Y. Liu, Y. Zhang, H. Duan, W. Shang, P. Tao, C. Song, et al., "A bioinspired, reusable, paper-based system for high-performance large-scale evaporation," Advanced Materials, vol. 27, no. 17, pp. 2768-2774, 2015.
[19] K. Kim, S. Yu, C. An, S.-W. Kim, and J.-H. Jang, "Mesoporous three-dimensional graphene networks for highly efficient solar desalination under 1 sun illumination," ACS applied materials & interfaces, vol. 10, no. 18, pp. 15602-15608, 2018.
[20] Q. Jiang and S. Singamaneni, "Water from wood: Pouring through pores," Joule, vol. 1, no. 3, pp. 429-430, 2017.
[21] C. Chen, Y. Li, J. Song, Z. Yang, Y. Kuang, E. Hitz, C. Jia, A. Gong, F. Jiang, J. Zhu, et al., "Highly flexible and efficient solar steam generation device," Advanced materials, vol. 29, no. 30, p. 1701756, 2017.
[22] Z. Zhang, P. Mu, J. He, Z. Zhu, H. Sun, H. Wei, W. Liang, and A. Li, "Facile and scalable fabrication of surface-modified sponge for efficient solar steam generation," ChemSusChem, vol. 12, no. 2, pp. 426-433, 2019.
[23] Y. Wang, L. Zhang, and P. Wang, "Self-floating carbon nanotube membrane on macroporous silica substrate for highly efficient solar-driven interfacial water evaporation," ACS Sustainable Chemistry & Engineering, vol. 4, no. 3, pp. 1223-1230, 2016.
[24] Q. Jiang, L. Tian, K.-K. Liu, S. Tadepalli, R. Raliya, P. Biswas, R. R. Naik, and S. Singamaneni, "Bilayered biofoam for highly efficient solar steam generation," Advanced Materials, vol. 28, no. 42, pp. 9400-9407, 2016.
[25] G. Ni, G. Li, S. V. Boriskina, H. Li, W. Yang, T. Zhang, and G. Chen, "Steam generation under one sun enabled by a floating structure with thermal concentration," Nature Energy, vol. 1, no. 9, p. 16126, 2016.
[26] X. Li, R. Lin, G. Ni, N. Xu, X. Hu, B. Zhu, G. Lv, J. Li, S. Zhu, and J. Zhu, "Three-dimensional artificial transpiration for efficient solar waste-water treatment," National Science Review, vol. 5, no. 1, pp. 70-77, 2017.
[27] N. Xu, X. Hu, W. Xu, X. Li, L. Zhou, S. Zhu, and J. Zhu, "Mushrooms as efficient solar steam-generation devices," Advanced Materials, vol. 29, no. 28, p. 1606762, 2017.
[28] Y. Liu, Z. Liu, Q. Huang, X. Liang, X. Zhou, H. Fu, Q. Wu, J. Zhang, and W. Xie, "A high-absorption and self-driven salt-resistant black gold nanoparticle-deposited sponge for highly efficient, salt-free, and long-term durable solar desalination," Journal of Materials Chemistry A, vol. 7, no. 6, pp. 2581-2588, 2019.
[29] H. Liu, X. Zhang, Z. Hong, Z. Pu, Q. Yao, J. Shi, G. Yang, B. Mi, B. Yang, X. Liu, et al., "A bioinspired capillary-driven pump for solar vapor generation," Nano Energy, vol. 42, pp. 115-121, 2017.
[30] L. Zhu, M. Gao, C. K. N. Peh, and G. W. Ho, "Solar-driven photothermal nanostructured materials designs and prerequisites for evaporation and catalysis applications," Materials Horizons, vol. 5, no. 3, pp. 323-343, 2018.
[31] M. Gao, L. Zhu, C. K. Peh, and G. W. Ho, "Solar absorber material and system designs for photothermal water vaporization towards clean water and energy production," Energy & Environmental Science, vol. 12, no. 3, pp. 841-864, 2019.

[32] X. Hu, W. Xu, L. Zhou, Y. Tan, Y. Wang, S. Zhu, and J. Zhu, "Tailoring graphene oxide-based aerogels for efficient solar steam generation under one sun," Advanced materials, vol. 29, no. 5, p. 1604031, 2017.

[33] J. Zhou, Z. Sun, M. Chen, J. Wang, W. Qiao, D. Long, and L. Ling, "Macroscopic and mechanically robust hollow carbon spheres with superior oil adsorption and light-to-heat evaporation properties," Advanced Functional Materials, vol. 26, no. 29, pp. 5368-5375, 2016.

[34] M. L. Brongersma, N. J. Halas, and P. Nordlander, "Plasmon-induced hot carrier science and technology," Nature nanotechnology, vol. 10, no. 1, p. 25, 2015.

[35] H. H. Richardson, M. T. Carlson, P. J. Tandler, P. Hernandez, and A. O. Govorov, "Experimental and theoretical studies of light-to-heat conversion and collective heating effects in metal nanoparticle solutions," Nano letters, vol. 9, no. 3, pp. 1139-1146, 2009.

[36] G. Liu, J. Xu, and K. Wang, "Solar water evaporation by black photothermal sheets," Nano Energy, vol. 41, pp. 269-284, 2017.

[37] L. Zhou, Y. Tan, J. Wang, W. Xu, Y. Yuan, W. Cai, S. Zhu, and J. Zhu, "3d self-assembly of aluminium nanoparticles for plasmon-enhanced solar desalination," Nature Photonics, vol. 10, no. 6, pp. 393-398, 2016.

[38] G. Zhu, J. Xu, W. Zhao, and F. Huang, "Constructing black titania with unique nanocage structure for solar desalination," ACS applied materials & interfaces, vol. 8, no. 46, pp. 31716-31721, 2016.

[39] M. Ye, J. Jia, Z. Wu, C. Qian, R. Chen, P. G. O'Brien, W. Sun, Y. Dong, and G. A. Ozin, "Synthesis of black tiox nanoparticles by mg reduction of tio2 nanocrystals and their application for solar water evaporation," Advanced Energy Materials, vol. 7, no. 4, p. 1601811, 2017.

[40] J. Wang, Y. Li, L. Deng, N. Wei, Y. Weng, S. Dong, D. Qi, J. Qiu, X. Chen, and T. Wu, "High-performance photothermal conversion of narrow-bandgap ti2o3 nanoparticles," Advanced Materials, vol. 29, no. 3, p. 1603730, 2017.

[41] D. Ding, W. Huang, C. Song, M. Yan, C. Guo, and S. Liu, "Non-stoichiometric moo 3-x quantum dots as a light-harvesting material for interfacial water evaporation," Chemical Communications, vol. 53, no. 50, pp. 6744-6747, 2017.

[42] Y. Liu, J. Chen, D. Guo, M. Cao, and L. Jiang, "Floatable, self-cleaning, and carbon-black-based superhydrophobic gauze for the solar evaporation enhancement at the air-water interface," ACS applied materials & interfaces, vol. 7, no. 24, pp. 13645-13652, 2015.

[43] Y. Yang, R. Zhao, T. Zhang, K. Zhao, P. Xiao, Y. Ma, P. M. Ajayan, G. Shi, and Y. Chen, "Graphene-based standalone solar energy converter for water desalination and purification," ACS nano, vol. 12, no. 1, pp. 829-835, 2018.

[44] Y. Li, T. Gao, Z. Yang, C. Chen, W. Luo, J. Song, E. Hitz, C. Jia, Y. Zhou, B. Liu, et al., "3d-printed, all-in-one evaporator for high-efficiency solar steam generation under 1 sun illumination," Advanced materials, vol. 29, no. 26, p. 1700981, 2017.

[45] X. Lin, J. Chen, Z. Yuan, M. Yang, G. Chen, D. Yu, M. Zhang, W. Hong, and X. Chen, "Integrative solar absorbers for highly efficient solar steam generation," Journal of Materials Chemistry A, vol. 6, no. 11, pp. 4642-4648, 2018.

[46] S. Loeb, C. Li, and J.-H. Kim, "Solar photothermal disinfection using broadband-light absorbing gold nanoparticles and carbon black," Environmental science & technology, vol. 52, no. 1, pp. 205-213, 2017.

[47] L. Zhou, S. Zhuang, C. He, Y. Tan, Z. Wang, and J. Zhu, "Self-assembled spectrum selective plasmonic absorbers with tunable bandwidth for solar energy conversion," Nano Energy, vol. 32, pp. 195-200, 2017.

[48] C. Li, D. Jiang, B. Huo, M. Ding, C. Huang, D. Jia, H. Li, C.-Y. Liu, and J. Liu, "Scalable and robust bilayer polymer foams for highly efficient and stable solar desalination," Nano Energy, vol. 60, pp. 841-849, 2019.

[49] W. H. Organization et al., "Safe drinking-water from desalination," tech. rep., World Health Organization, 2011.

What is claimed is:

1. A floatable interfacial solar-driven evaporation structure, comprising:
    a water impervious thermal insulation layer adapted to float on a body of water;
    a porous absorber layer disposed on the water impervious thermal insulation layer;
    an interlocked non-woven cotton fiber layer having:
        a first portion disposed between the water impervious insulation layer and the porous absorber layer, and
        one or more additional portions configured to extend into the body of water to act as a capillary-driven pump to transport water from the body of water to the porous absorber layer; and
    an ultra-black photothermal paint covering an exposed upper surface of the porous absorber layer to convert solar radiation impinging on the ultra-black photothermal paint into heat for use in generating water vapor from water in the porous absorber layer.

2. The floatable interfacial solar-driven evaporation structure of claim 1, wherein the structure is used in a water desalination system.

3. The floatable interfacial solar-driven evaporation structure of claim 1, wherein ultra-black photothermal paint comprises Black 3.0 paint.

4. The floatable interfacial solar-driven evaporation structure of claim 1, wherein ultra-black photothermal paint comprises cuttlefish ink or squid ink.

5. The floatable interfacial solar-driven evaporation structure of claim 1, wherein the ultra-black photothermal paint absorbs at least 95% of visible and near-infrared light.

6. The floatable interfacial solar-driven evaporation structure of claim 1, wherein the ultra-black photothermal paint absorbs at least 99% of visible light and 97.5% of near-infrared light.

7. The floatable interfacial solar-driven evaporation structure of claim 1, wherein the interlocked non-woven cotton fiber layer forms a two-dimensional water path from the body of water to the porous absorber layer.

8. The floatable interfacial solar-driven evaporation structure of claim 1, wherein the interlocked non-woven cotton fiber layer comprises Webril pure cotton wipe material.

9. The floatable interfacial solar-driven evaporation structure of claim 1, wherein the porous absorber layer comprises a sheet of hot-pressed melamine foam.

10. The floatable interfacial solar-driven evaporation structure of claim 1, wherein the water impervious thermal insulation layer is configured to reduce heat transfer between the porous absorber layer and the body of water.

11. The floatable interfacial solar-driven evaporation structure of claim 1, wherein the water impervious thermal insulation layer comprises Polyvinyl chloride (PVC) foam.

12. A floatable system for desalinating water from a body of water, comprising:
(a) an interfacial solar-driven evaporation structure, comprising:
a water impervious thermal insulation layer adapted to float on the body of water;
a porous absorber layer on the water impervious thermal insulation layer;
an interlocked non-woven cotton fiber layer having a portion thereof between the water impervious insulation layer and the porous absorber layer and one or more additional portions configured to extend to the body of water to act as a capillary-driven pump to transport water from the body of water to the porous absorber layer; and
an ultra-black photothermal paint covering an exposed upper surface of the porous absorber layer to convert solar radiation impinging on the ultra-black photothermal paint into heat for use in generating water vapor from water in the porous absorber layer; and
(b) a condensation chamber to collect and condense the water vapor from the interfacial solar-driven evaporation structure into liquid water.

13. The floatable system of claim 12, wherein ultra-black photothermal paint comprises Black 3.0 paint.

14. The floatable system of claim 12, wherein ultra-black photothermal paint comprises cuttlefish ink or squid ink.

15. The floatable system of claim 12, wherein the ultra-black photothermal paint absorbs at least 95% of visible and near-infrared light.

16. The floatable system of claim 12, wherein the ultra-black photothermal paint absorbs at least 99% of visible light and 97.5% of near-infrared light.

17. The floatable system of claim 12, wherein the interlocked non-woven cotton fiber layer forms a two-dimensional water path from the body of water to the porous absorber layer.

18. The floatable system of claim 12, wherein the interlocked non-woven cotton fiber layer comprises Webril pure cotton wipe material.

19. The floatable system of claim 12, wherein the porous absorber layer comprises a sheet of hot-pressed melamine foam.

20. The floatable system of claim 12, wherein the water impervious thermal insulation layer comprises Polyvinyl chloride (PVC) foam.

* * * * *